Aug. 26, 1952     D. F. WALKER     2,608,345
ELECTRICAL COMPUTING INSTRUMENT
Filed May 19, 1948     2 SHEETS—SHEET 1
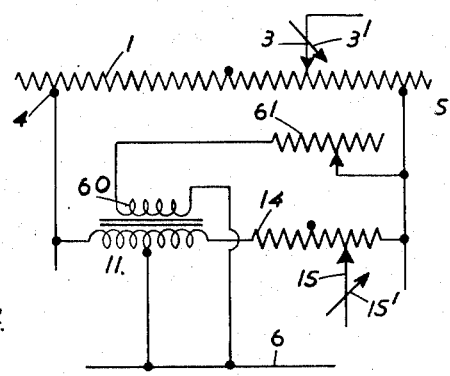
FIG.4.
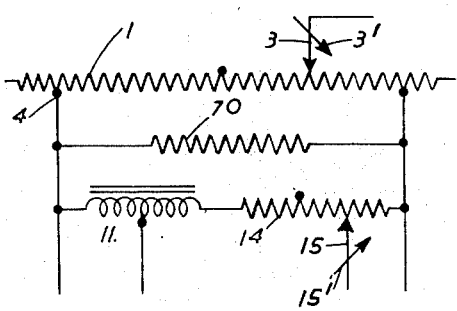
FIG.5.
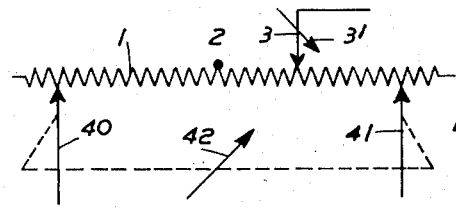
FIG.8.
FIG.1.
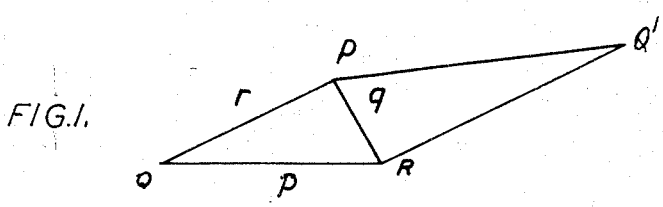
Inventor
DONALD F. WALKER
By Young, Emery & Thompson
Attorneys Inventor:
DONALD F. WALKER
By Young, Emery & Thompson
Attorneys Patented Aug. 26, 1952

2,608,345

UNITED STATES PATENT OFFICE 2,608,345

ELECTRICAL COMPUTING INSTRUMENT

Donald F. Walker, Hollinwood, England, assignor to Ferranti Limited, Hollinwood, England, a British company Application May 19, 1948, Serial No. 27,990
In Great Britain May 21, 1947

10 Claims. (Cl. 235—61)

1

This invention relates to electrical computing instruments of the kind adapted for indicating or deriving the value of an unknown quantity of a problem to be solved from three known quantities where the latter quantities are capable of being represented by sufficient information of the lengths of sides or values of angles to determine a triangle uniquely, the unknown quantity being one of the data not supplied, i. e. the length of a side or the value of an angle. Such problems are of frequent occurrence in connection with artillery predictors, navigational computers, and the like.

A particular example of such a problem arises in the case of radio navigational systems of the kind where the information received by the craft is in the form of (1) a time interval between signals radiated from a master station and a slave station, these two stations being fixed and their locations known, and (2) the bearing at the craft of the master station. As will be shown in more detail hereinafter there may be derived from this information data that may be represented by (a) the length of a first side of a triangle, (b) the length—which may be positive or negative—obtained by subtracting the length of the second side from the length of the third side, and (c) the value of the angle between the first and second sides, the unknown quantity being the length of the second side.

It is of course possible to draw a triangle from the data supplied and by measuring the appropriate side or angle determine the unknown quantity; but this procedure is often inconvenient to apply, especially when the known quantities are continuously changing.

The main object of the present invention, therefore, is to provide an electrical instrument of the kind above defined for automatically and continuously deriving the unknown quantity for visible indication thereof or for application to a further computer stage.

In the accompanying drawings:

Figure 1 is a diagram to illustrate the principle of the invention,

Figures 3 to 6 are circuit diagrams to illustrate modifications of the embodiment shown in Figure 2, Figure 8 is a circuit diagram to illustrate a modification of any of the above embodiments.

In carrying out the invention according to one

2 form by way of example, an aircraft at P—see Figure 1—receives navigational information in the form of pulse signals radiated from a fixed master station R and its fixed associated slave station Q. Pulses are transmitted cyclically from these stations, each cycle comprising a pulse transmitted from the master station followed by a pulse transmitted from the slave station; the time interval between each such pair of pulses is very accurately adjusted to a constant known value.

The pair of pulses of each cycle is received by equipment on the aircraft and displayed on a cathode ray tube screen so that the time interval between the reception of the pulses may be accurately determined. This time interval is clearly dependent on the difference between the distances of the stations from the aircraft.

The aircraft is additionally provided with direction-finding equipment designed to cooperate with a rotating beam radio beam located at the master station and operating on the well-known omni-directional radio range principle. The bearing at the aircraft of the master station is thereby readily ascertainable.

The electrical computing instrument in accordance with the invention provides from the foregoing pulse and bearing information received in the aircraft an immediate indication at any instant of the aircraft's distance from the master station R, thus simplifying and accelerating the ascertainment of the aircraft's position. The instrument, in effect, "solves" the triangle PQR when the following information is set into it, the geometrical convention being observed of referring to the angles of the triangle by the capital letters P, Q and R and the sides opposite these angles by the lower case letters $p$, $q$ and $r$ respectively: (a) the length of the first side $p$; (b) the difference obtained by subtracting the length of the second side $q$ from the length of the third side $r$, i. e. $(r-q)$; and (c) the value of the angle R between the first and second sides $p$ and $q$. Item (a) is constant and is known. Item (b) is obtained from the pulse receiving equipment carried by the aircraft, the cathode ray tube screen of which is calibrated to provide this information direct from the spacing of the pulses along a horizontal time-base. Item (c) is obtained from the direction-finding equipment, also carried by the aircraft. The unknown quantity derived by the instrument is the length of the second side $q$, i. e. the distance of the aircraft from the master station R.

Figure 2:
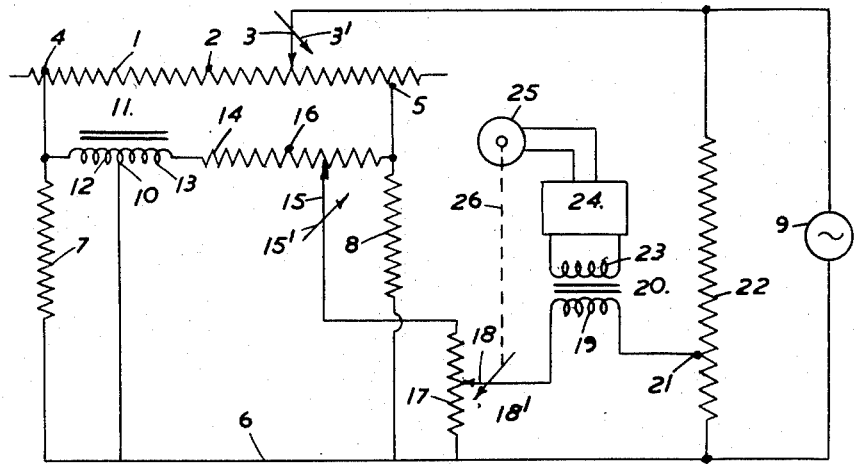
Figure 2 is a circuit diagram to illustrate one embodiment of the invention.

In carrying out the invention, therefore, according to one form with reference to Figure 2 an electrical computing instrument consists of a uniform resistor 1 having a mid-point 2 and a variable tapping 3 adjustable by a control $3^1$. This control $3^1$ has a pointer arranged to traverse a dial calibrated in terms of the difference length $(r-q)$ in correspondence with the time-base calibrations of the cathode ray tube of the pulse-receiving equipment above referred to. The dial calibrations are so related to the position of tapping 3 that for each setting of control $3^1$ the resistance between tapping 3 and mid-point 2 of resistor 1 represents to a convenient scale that value of the difference length $(r-q)$ indicated by the dial. Two fixed points 4, 5 on this resistor 1, symmetrically disposed with respect to mid-point 2, i. e. so that the resistance between points 2 and 4 is equal to that between points 2 and 5, are connected to a common lead 6 by way of equal first and second impedance means in the form of equal fixed resistors 7 and 8 respectively. It will be seen that the resistances of the two parallel paths between mid-point 2 and common lead 6 by way of resistors 7 and 8 respectively are equal. The value of each of these resistances is such as to represent the known constant length of the first side $p$ to the same scale as that by which the resistance between tapping 3 and mid-point 2 represents the difference length $(r-q)$. A source 9 of A. C. electrical energy is connected across tapping 3 and common lead 6. The mid-point tapping 10 of a 1:1 reversing auto-transformer 11 is connected to common lead 6; the primary lead 12 is connected to the end of resistor 7 remote from lead 6 and the secondary 13 is connected by way of cosine potentiometer 14, having a variable tapping 15 adjustable by a control $15^1$, to the end of resistor 8 remote from lead 6. Potentiometer 14 operates according to a cosine law with respect to its mid-point 16, i. e. linear movement of tapping 15 in proportion to the value of a given angle $\theta$ alters the resistance between tapping 15 and mid-point 16 in proportion to $\cos \theta$; when $\theta$ is 90 degrees the tapping is at mid-point 16; the transformer end of potentiometer 14 corresponds to 180 degrees and the other end to zero degrees. Between tapping 15 and common lead 6 is connected a linear variable potentiometer 17 having a variable tapping 18, adjustable by a control $18^1$, connected by way of the primary 19 of a control transformer 20 to a tapping 21 on a fixed potentiometer 22 connected across the supply 9. The output from the secondary 23 of the transformer 20, after amplification by amplifier 24, is applied to a servomotor 25 that operates control $18^1$ to adjust the position of tapping 18 of potentiometer 17 by means of a suitable drive indicated by 26, in a manner that will be made clearer hereinafter. Controls $3^1$ and $15^1$ may be described as "pre-set," that is to say operated by hand or by apparatus other than the computing instrument itself, as distinct from control $18^1$, which is operated by servomotor 25 forming part of that instrument.

In operation the navigator of the aircraft continually adjusts pre-set control $3^1$ so that the value of $(r-q)$ indicated by the dial corresponds to that indicated on the cathode ray tube. Tapping 15 of cosine potentiometer 14 is similarly maintained by means of pre-set control $15^1$ so that the angle $\theta$ corresponds to the angle R, the voltage between tapping 15 and mid-point 16 being therefore proportional to $\cos R$. This angle is determined by a simple subtraction process from the bearing of master station R at the aircraft, as ascertained by the direction finding equipment above referred to, and the known constant bearing at master station R of slave station Q. As is demonstrated below, the difference voltage applied to potentiometer 17 i. e. the voltage between tapping 15 and common lead 6, is proportional to $$\frac{1}{q}$$

the reciprocal of the length of the unknown second side. The combination of the linear and fixed potentiometers 17 and 22 serves to invert this reciprocal, as will be made clear later, so that when the resultant, i. e. the output, voltage of potentiometer 17 is balanced by the output voltage of fixed potentiometer 22, in other words when the voltage between tapping 18 and common lead 6 is balanced by the voltage between tapping 21 and common lead 6, the position of tapping 18 relative to common lead 6 is in conformity with the triangle representing the known quantities, and so is proportional to the length of side $q$, which length, or the quantity it represents, may be read off on a linear scale adjacent to control $18^1$. When these voltages are not equal an out-of-balance current flows in transformer 20; the amplified secondary voltage then operates servomotor 25, which adjusts tapping 18 (through control $18^1$ and drive 26) in such a direction as to bring the output voltages into balance; when this is attained the out-of-balance current ceases to flow and motor 25 ceases to operate. This adjusting procedure may occur continuously, controls $3^1$ and $15^1$ being continuously adjusted by the navigator whilst control $18^1$ is continuously adjusted in response thereto, as above described, by the apparatus in accordance with the invention, thus giving a continuous indication of the value of $q$.

The operation of the above equipment will be made clearer by the following theoretical explanation.

A standard trigonometrical formula for the triangle PQR is $$r^2 = p^2 + q^2 - 2pq \cos R \tag{1}$$

As we are given $(r-q)$ we may substitute $(q+r-q)$ for $r$:

Hence $(q+r-q)^2 = p^2 + q^2 - 2pq \cos R$, from which may be derived the equation:

$$\frac{1}{q} = \frac{1+\cos R}{p-(r-q)} - \frac{1-\cos R}{p+(r-q)} \tag{2}$$

Reverting now to the apparatus above described, as already stated the resistance between mid-point 2 of resistance 1 and common lead 6 by way of either of fixed resistances 7 or 8 represents the length of side $p$. When the resistance between tapping 3 and mid-point 2 is proportional to $(r-q)$ as above described, the resistances of the two parallel paths between tapping 3 and common lead 6 become $p+(r-q)$ and $p-(r-q)$. Using the suffix 1 when referring to the parallel path between tapping 3 and common lead 6 by way of point 4 and resistance 7 and the suffix 2 when referring to the other parallel path we get for the currents $i_1$ and $i_2$ in the two paths:

$$i_1 \propto \frac{1}{p+(r-q)} \quad \text{and} \quad i_2 \propto \frac{1}{p-(r-q)} \tag{3}$$

The voltages $v_1$ and $v_2$ developed across resistances 7 and 8 respectively and applied to cosine potentiometer 14 are respectively proportional to the above currents, since the values of fixed resistances 7 and 8 are equal. Voltage $v_1$ is reversed in polarity by reversing transformer 11 so that it is the sum of voltages $v_1$ and $v_2$, rather than the difference, that is applied to cosine potentiometer 14. The voltage developed between tapping 15 and mid-point 16 of this potentiometer is therefore proportional to $\frac{1}{2}(v_1+v_2) \cos \theta$, and the voltage between tapping 15 and the end of potentiometer 14 connected to resistance 8 (it is assumed for the moment that the value of $\theta$ lies between 0 and 90 degrees) is proportional to $$\tfrac{1}{2}(v_1+v_2)(1-\cos \theta) \qquad (4)$$

The voltage given in (4) subtracted from $v_2$ is thus the difference voltage ($v_3$, say) between tapping 15 and common lead 6. Hence:

$$v_3 \propto v_2 - \tfrac{1}{2}(v_1+v_2)(1-\cos \theta) \qquad (5)$$

On substituting for $v_1$ and $v_2$ the values from (3) to which $i_1$ and $i_2$ are proportional and substituting R for $\theta$ we get:

$$v_3 \propto \frac{1+\cos R}{p-(r-q)} - \frac{1-\cos R}{p+(r-q)} \qquad (6)$$

The difference voltage $v_3$ may alternatively be derived from the voltage between tapping 15 and the end of potentiometer 14 connected to autotransformer secondary 13 less the voltage across this secondary. We then get:

$$v_3 \propto \frac{v_1+v_2}{2}(1+\cos R)-v_1 \qquad (7)$$

from which expression (6) may again be obtained.
Hence, from expression (2), $$v_3 \propto \frac{1}{q}$$

Let the fractions of the resistances of the linear and fixed potentiometers 17 and 22 between tappings 18 and 21 and common lead 6 be $s$ and $t$ respectively. Then when the resultant voltage $S \times v_3$ developed between tapping 18 and common lead 6 is balanced by the output voltage of potentiometer 22 so that no out-of-balance current flows we get:

$s \times v_3 = t \times v$, where $v$ is the supply voltage hence $$\frac{s}{q} = t \times v, \text{ or } s \propto q$$

The setting of tapping 18 relative to common lead 6, as indicated by control $18^1$, is thus proportional to the length $q$ required and hence to the result of the computation. The tapping 21 on fixed potentiometer 22 to give the fixed fraction $t$ is chosen so as to allow of a convenient range of adjustment of tapping 18.

When R is between 90 and 180 degrees, tapping 15 of cosine potentiometer 14 operates on the other side of mid-point 16. The term $(1-\cos R)$ in expression (4) (with R substituted for $\theta$) becomes $(1+\cos R)$, cos R itself being now a negative term.

Similarly when the length of side $q$ is greater than the length of side $r$ tapping 3 of resistance 1 operates on the other side of mid-point 2. The expression $(r-q)$ now becomes negative but the correct result again appears at linear potentiometer 17.

The instrument as above described may with slight modifications be used where the known quantities are such as may be represented by all three sides of a triangle, the first side or base being constant and the unknown quantity being represented by one of the base angles. In this case the triangle representing the problem is arranged so that the wanted base angle is the base angle R. The equal resistances between midpoint 2 and common lead 6 are made to correspond to the constant length of the side $p$ and the drive 26 is connected to control $15^1$ instead of to control $18^1$. Controls $3^1$ and $18^1$ are then adjusted by hand, or automatically by some associated apparatus, to represent the length $(r-q)$ and the length $q$ respectively, whilst motor 25 maintains control $15^1$ in conformity with the triangle representing the problem, i. e. so that the angle $\theta$ becomes angle R and may be read off from the scale associated with control $15^1$.

If the known quantities are such as may be represented by the fixed base $p$, the side $q$ and the included angle R, the unkonwn quantity being the side $r$, controls $15^1$ and $18^1$ are adjusted to represent R and $q$ respectively whilst the motor maintains control $3^1$ in conformity. The answer derived from the position of control $3^1$ will be $(r-q)$, from which the value of $r$ may be obtained by adding the known quantity $q$, e. g. by means of a differential gear.

Figures 3, 6:
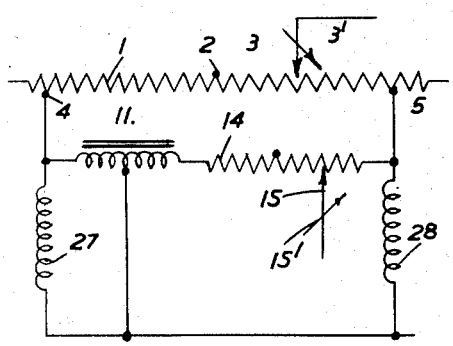

In any of the above-described embodiments resistances 7 and 8 may be replaced by chokes designed to yield voltages proportional to the currents flowing through them. This is illustrated in Figure 3, which shows only the pertinent portion of Figure 2, 27 and 28 being the chokes substituted for resistances 7 and 8 respectively.

In the above described embodiments, or as modified in the preceding paragraph, it is assumed that the voltages $v_1$ and $v_2$ across the impedances between uniform resistance 1 and common lead 6 are entirely due to the currents $i_1$ and $i_2$ set up by the supply voltage. In practice however voltage $v_2$ across the impedance which is included in the secondary circuit of 1:1 transformer 11 is to some extent effected by the local current set up in this circuit by transformer action and hence by $i_1$. Similarly the current in the primary circuit, and hence $v_1$ is affected by $i_2$. To eliminate or reduce the errors that result from this a correcting winding 60 (see Figure 4) is added to transformer 11. One end of winding 60 is connected to common lead 6 and the other end is connected by way of a variable resistance 61 to fixed point 5. Winding 60 is connected in such a sense that it sets up currents in the primary and secondary circuits which by adjustment of variable resistance 61 may be made to balance out the undesired currents in these circuits.

In an alternative arrangement for eliminating or reducing these errors, illustrated in Figure 5, a resistance 70 may be connected across resistance 1 having a value equal to that of cosine potentiometer 14, thus causing neutralizing currents to be set up in a similar manner.

The impedances between the uniform resistance 1 and the common lead 6 may alternatively take the form of primaries 50 and 51 (see Figure 6) of transformers 52 and 53 of equal ratio, the secondaries 54 and 55 of which are connected as shown to cosine potentiometer 14. It will be appreciated that in this embodiment the 1:1 transformer 11 is not necessary, the required voltage reversal to produce $(v_1+v_2)$ being effected by reversing the connections to one of the secondaries.

Figure 7:
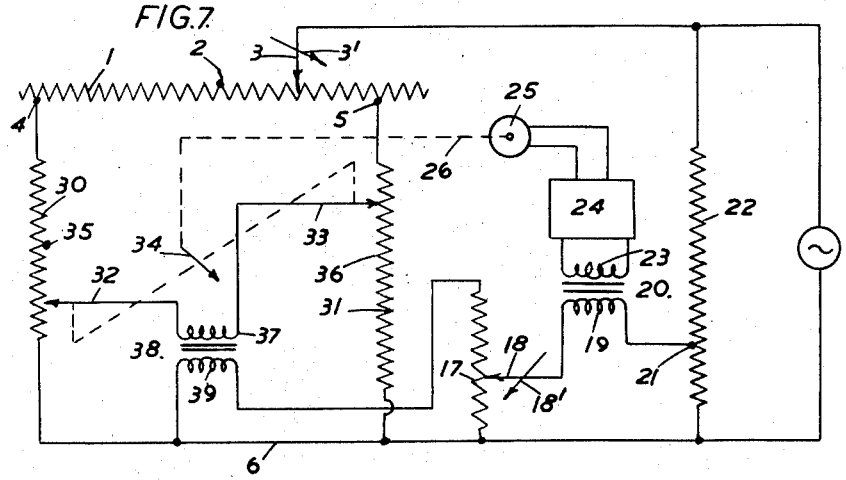
Figure 7 is a circuit diagram to illustrate another embodiment of the invention.

Another embodiment of the invention is illustrated in Figure 7. In this the two fixed resistances 7 and 8 are replaced by two equal-resistance cosine potentiometers 30 and 31 respectively, each covering the range 0°–180° and having tappings 32 and 33 respectively. The potentiometers are oppositely disposed so that the zero angle end of potentiometer 30 is connected to common lead 6 but the zero angle end of potentiometer 31 is connected to resistance 1. Tappings 32 and 33 are ganged to be moved in opposite directions by a control 34 so that the positions of the two tappings are always appropriate to the same angle, the cosine of which is proportional to the distance of each tapping from the mid-point of the associated potentiometer; these two tappings are thus always on opposite sides of mid-points 35, 36 with respect to common lead 6. Tappings 32 and 33 are connected together by way of the primary 37 of a transformer 38, the secondary 39 of which is connected across potentiometer 17 by way of common lead 6. The cosine potentiometer 14 and transformer 11 of the embodiment described with reference to Figure 1 are omitted but the other items of equipment remain the same.

The operation of the instrument is exactly as described in the said embodiment except that control 34 is now adjusted instead of control $15^1$. In Figure 7, control 34 is shown as being adjusted by motor 25 (through drive 26), thus illustrating the use of the instrument for the solution of that type of problem where the angle R is unknown and is to be found; but it will of course be understood that this embodiment may also be used as in the said embodiment for the solution of those types of problems where the angle R is known and the control 34 is accordingly set by hand or by the associated apparatus.

The theoretical explanation of the principle of operation of this embodiment is as follows. From the foregoing description it will be seen that the output potential between tapping 32 of potentiometer 30 and common lead 6 is proportional to $(1-\cos\theta)v_1$ and the output potential between tapping 33 of potentiometer 31 and common lead 6 proportional to $(1+\cos\theta)v_2$, where $\theta$ is the angle to which control 34 is adjusted and $v_1$ and $v_2$ are the respective potentials developed across the potentiometer. When the position of control 34 is in conformity with the triangle PQR we can substitute R for $\theta$; the voltage applied to potentiometer 17 is therefore proportional to the difference between these output potentials, i. e.

$$v_3 \propto (1+\cos R)v_2 - (1-\cos R)v_1 \quad (8)$$

substituting the usual values of $i_1$ and $i_2$ to which $v_1$ and $v_2$ are proportional (see expression (3) above) we get:

$$v_3 \propto \frac{1+\cos R}{p-(r-q)} - \frac{1-\cos R}{p+(r-q)}$$

which is the same as expression (6).

So $v_3$ is again proportional to the reciprocal of $q$ and the value of $q$ is dependent on the position of control $18^1$ as before.

Any of the above-described embodiments may be modified to allow the length of the base $p$ to be adjustable instead of fixed. This is illustrated by Figure 8. Fixed points 4 and 5 on uniform resistance 3 of the previous embodiments are here replaced by variable tappings 40 and 41 which are ganged under a control 42 to move in opposite directions, thereby maintaining the resistance between mid-point 2 and tapping 40 always equal to the resistance between mid-point 2 and tapping 41. Control 42 may be adjusted by the motor if the length of the base $p$ is the unknown quantity to be found; otherwise it may be adjusted by hand or by the associated apparatus. This modification clearly extends the range of problems that the instrument can solve. For instance, if the known quantities are such as may be represented by all three sides of a triangle, all three sides may be continuously variable instead of one having to be fixed; and solutions may be obtained when the three known quantities are such as may be represented by two sides and the non-included angle, e. g. the sides $p$ and $r$ and the angle R, provided the data is such as to determine the triangle uniquely.

The cosine potentiometers as used in the above embodiments may comprise resistances wound according to a cosine law and having slides moving uniformly, or uniformly wound resistances having slides moving in accordance with a cosine law.

It is to be understood that the apparatus above described may be modified in many respects without departing from the invention. With slight modification of the equipment sine potentiometers may for instance be used instead of cosine. The means for deriving the out-of-balance current may also be modified; the voltage directly proportional to the source 9 of electrical energy may in Figure 2 be applied direct to tapping 18, the primary 19 being included in the lead from potentiometer 17 to tapping 15.

As the apparatus works on the null balance principle the supply voltage need not be constant but may with advantage be varied so as not to overload any part of the apparatus when one or more of the sliders is operating near an extreme position on the associated resistance or potentiometer.

In any of the above described embodiments the control adjusted by the motor may alternatively be applied to a further computer stage.

I claim:

1. An electrical computing instrument, for deriving the value of an unknown quantity of a problem to be solved from three known quantities where the latter can be represented as elements of a triangle, comprising a uniform resistance having two connecting points on said uniform resistance symmetrically disposed with respect to its mid-point, a variable tapping for said resistance, a first control associated with said variable tapping, a conductor element, equal first and second impedance means connecting said two points respectively to the conductor element for yielding voltages $v_1$ and $v_2$ proportional to the currents flowing through them respectively, a source of electrical energy connected across said variable tapping and said conductor element, means for providing a difference voltage proportional to the difference between said voltage $v_2$ and a voltage of value $\frac{1}{2}(v_1+v_2)(1-\cos\theta)$, said means including a second control, the angle $\theta$ being represented by the position of said second control, a linear potentiometer having a variable tapping which derives an output voltage proportional to the said difference voltage, reference voltage means connected with said source and providing a reference voltage, out-of-balance current means connected between the last mentioned variable tapping and said reference voltage means thereby deriving out-of-balance from the difference between said output voltage and said reference voltage, a third control associated with the said variable tapping of said linear potentiometer and the position of which third control directly determines the value of said out-of-balance current, a motor actuated by said out-of-balance current and serving to adjust one of said controls when the other two of said controls are pre-set, in order to bring the quantity represented by the position of the motor-adjusted control into conformity with the triangle representing said known quantities.

2. An electrical computing instrument as claimed in claim 1 wherein each of said impedance means comprises a resistance.

3. An electrical computing instrument as claimed in claim 1 wherein each of said impedance means comprises a choke.

4. An electrical computing instrument as claimed in claim 1 wherein said impedance means comprise transformers the primaries of which are connected between said common lead and the appropriate ones of said two points and the secondaries of which are connected across opposite ends of said cosine potentiometer and said common lead.

5. An instrument as claimed in claim 1 wherein said means for deriving a difference voltage includes means for applying a voltage proportional to $(v_1+v_2)$ to a cosine potentiometer and the latter has a variable tapping controlled by said second control and said linear potentiometer is connected between said cosine potentiometer and said conductor element.

6. An electrical computing instrument as claimed in claim 1 wherein said first and second impedance means are constituted by two oppositely disposed cosine potentiometers of equal resistance connecting said conductor element to said two connecting points respectively, and said means for deriving a difference voltage includes variable tappings for said potentiometers respectively, ganging means whereby said variable tappings are ganged so as to be moved in opposite directions, said second control actuating said ganging means thereby yielding between one said ganged variable tapping and said conductor element a potential proportional to $(1-\cos\theta)v_1$, and between the other said ganged variable tapping and said conductor element a potential proportional to $(1+\cos\theta)v_2$.

7. An electrical computing instrument as claimed in claim 1, said means for deriving the difference voltage including means for applying a voltage proportional to $(v_1+v_2)$ to said cosine potentiometer, said last mentioned means including a reversing transformer.

8. An electrical computing instrument as claimed in claim 1 wherein said means for providing a difference voltage includes a cosine potentiometer, means including a reversing transformer for applying a voltage proportional to $(v_1+v_2)$ to a cosine potentiometer, neutralizing means to counteract any undesired currents inductively set up by said reversing transformer, said neutralizing means comprising an additional secondary winding on said reversing transformer, the output of said additional winding being adapted to be variably applied between one of said two points and said common lead.

9. An electrical computing instrument as claimed in claim 1 wherein said first and second impedance means are constituted by two oppositely disposed cosine potentiometers of equal resistance connecting said conductor element to said two connecting points respectively, and said means for deriving a difference voltage includes variable tapping for said potentiometers respectively, ganging means whereby said variable tappings are ganged so as to be moved in opposite directions, said second control actuating said ganging means thereby yielding between one said ganged variable tapping and said conductor element an output potential proportional to $(1-\cos\theta)v_1$, and between the other said ganged variable tapping and said conductor element an output potential proportional to $(1+\cos\theta)v_2$, and said means for providing an output voltage includes a transformer, the primary of which is connected between said ganged variable tappings and the secondary of which is connected to said linear potentiometer third control.

10. An electrical computing instrument as claimed in claim 1 wherein said connecting points are in the form of variable tappings and a fourth control is provided and means whereby said last mentioned tappings are ganged under said fourth control to move in opposite directions while remaining symmetrically disposed with respect to the said mid-point.

DONALD F. WALKER.

REFERENCES CITED

The following references are of record in the file of this patent:

UNITED STATES PATENTS

| Number | Name | Date |
|---|---|---|
| 2,066,949 | Ruiz | Jan. 5, 1937 |
| 2,438,112 | Darlington | Mar. 23, 1948 |
| 2,439,381 | Darlington | Apr. 13, 1948 |
| 2,444,933 | Jasperson | July 13, 1948 |